Figures 1, 2:
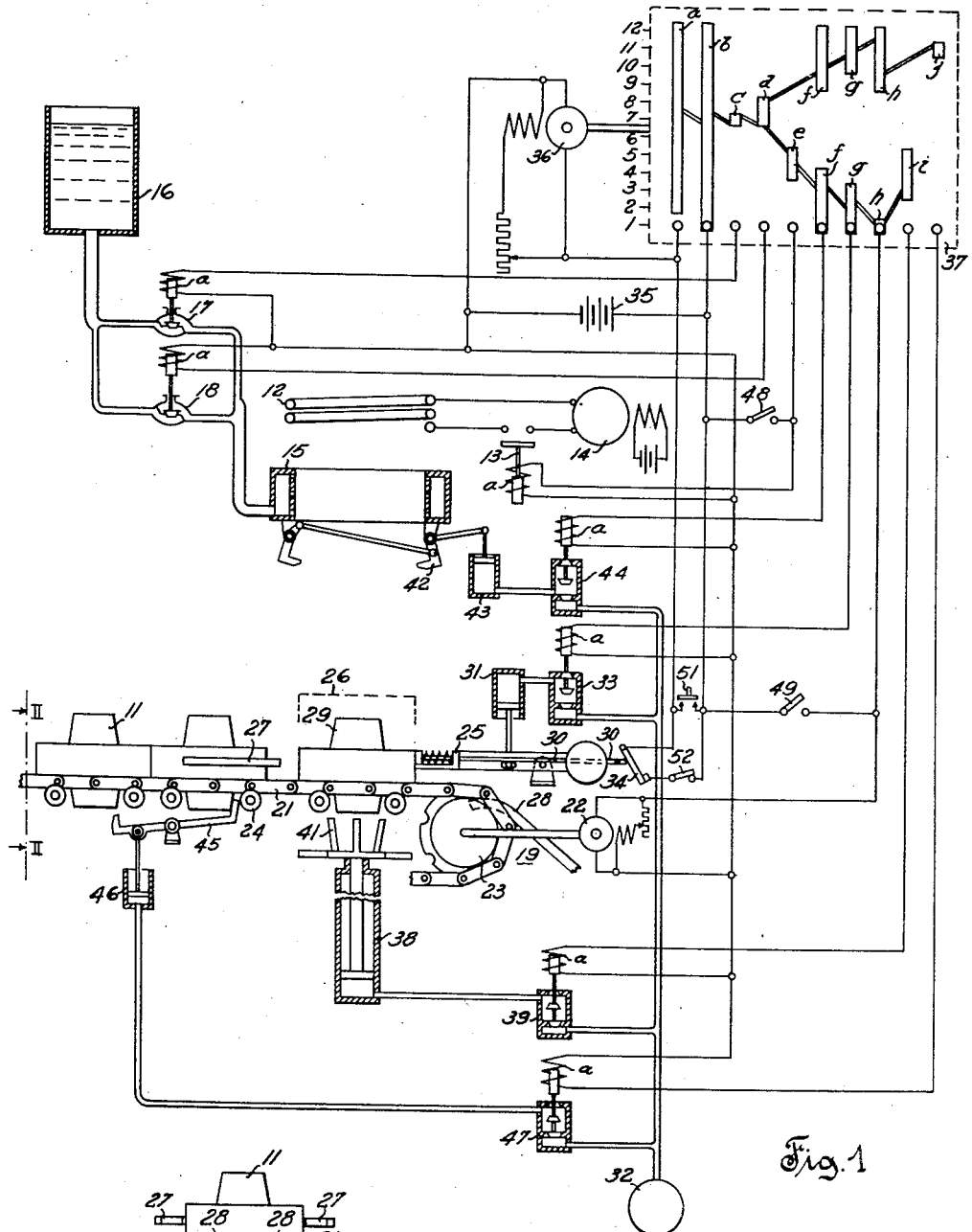

May 2, 1950 D. JOURNEAUX 2,506,425
COMBINED CHAIN BELT AND ELEVATOR CONVEYER
Filed Sept. 14, 1945 4 Sheets-Sheet 1

Inventor
Didier Journeaux

May 2, 1950     D. JOURNEAUX     2,506,425
COMBINED CHAIN BELT AND ELEVATOR CONVEYER
Filed Sept. 14, 1945     4 Sheets-Sheet 2

Inventor
Didier Journeaux

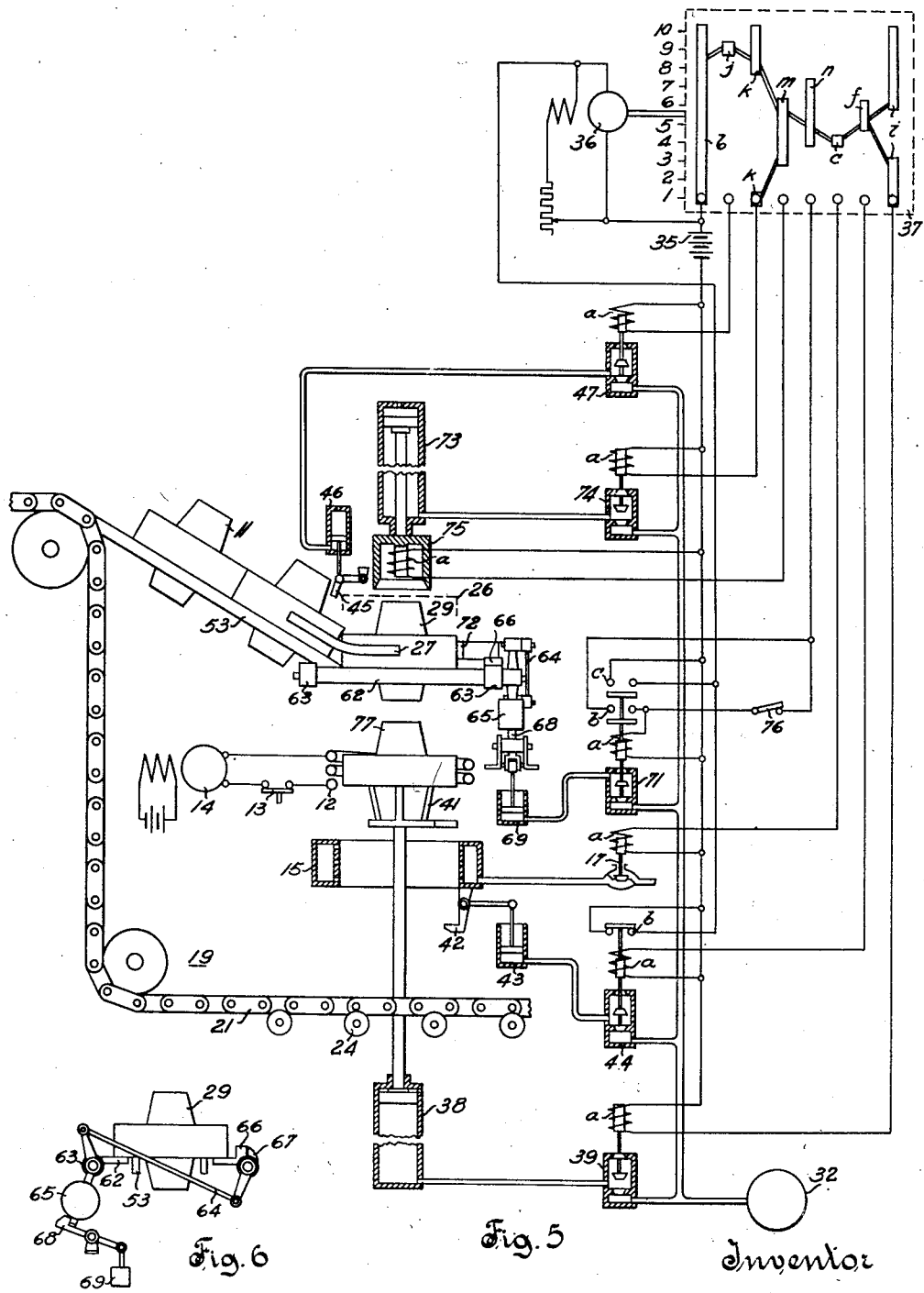

Patented May 2, 1950

2,506,425

UNITED STATES PATENT OFFICE 2,506,425

COMBINED CHAIN BELT AND ELEVATOR CONVEYER

Didier Journeaux, Wauwatosa, Wis., assignor to Allis-Chalmers Manufacturing Company, Milwaukee, Wis., a corporation of Delaware Application September 14, 1945, Serial No. 616,285

16 Claims. (Cl. 266—4)

This invention relates in general to improvements in belt and elevator conveyer means and more particularly to belt and conveyer means for use in moving a series of identical objects in an out of inductive relation with a heating inductor and in and out of quenching position with respect to a quenching nozzle.

When identical objects in large number are to be heat treated by induction the objects may sometimes be deposited on a conveyer to move them successively past a stationary inductor so disposed as to induce heating currents in the desired portions of the objects. Satisfactory and economical heating of objects by induction, however, generally requires that the objects be inserted within an inductor rather than being merely brought alongside thereof. The objects progressing on a conveyer may accordingly be arrested in their transit while an inductor is momentarily disposed in inductive relation therewith. Such arrangements require that the inductor be provided with flexible or detachable connections and, when the heating operation is to be followed by a quench, the mechanism for coordinately positioning the inductor and the quenching nozzle becomes excessively complicated.

It is therefore more advantageous to convey the objects by means of a chain belt which lends itself readily to the deposit of objects thereon and to the removal of objects therefrom, and to utilize a stationary inductor and a stationary quenching nozzle disposed in vertical alignment with a work loading station at which the objects may be stopped in their transit. A vertical elevator may then be caused to move the objects from the work loading station into suitable positions defining work processing stations with respect to the inductor and to the quenching nozzle and thereafter return the objects to the conveyer at the work loading station or at another point thereof defining a work unloading station. The objects may be directly transferred between the conveyer and the elevator or may be moved therebetween by gravity through a suitable chute. The objects may require being moved transversely through the chute, which is then provided with hinged rails disposed to yield to permit passage of the objects therebetween in one direction. The different elements of the system may be controlled by timing means operating continuously or in response to the arrival of an object into the loading station.

It is therefore a purpose of the present invention to provide an improved conveyer system for use in heat treating a series of identical objects utilizing a conveyer of the chain belt type for positioning the objects in a station for further handling through a cycle of operations.

Another purpose of the present invention is to provide an improved conveyer system of use in heat treating a series of identical objects in which objects may be deposited at random on a conveyer for transfer to a predetermined station.

Another purpose of the present invention is to provide an improved conveyer system for use in heat treating a series of identical objects in which objects may be automatically positioned at a station for vertical movement into a position in inductive relation with an inductor.

Another purpose of the present invention is to provide an improved conveyer system for use in heat treating a series of identical objects in which an object may be moved transversely through a chute serving for the transfer thereof to bring the objects into a position in inductive relation with an inductor.

Another purpose of the present invention is to provide an improved conveyer system for use in heat treating a series of identical objects in which an object may be held in inductive relation with an inductor while another object is being held in a quenching nozzle associated with the inductor.

Figure 3:
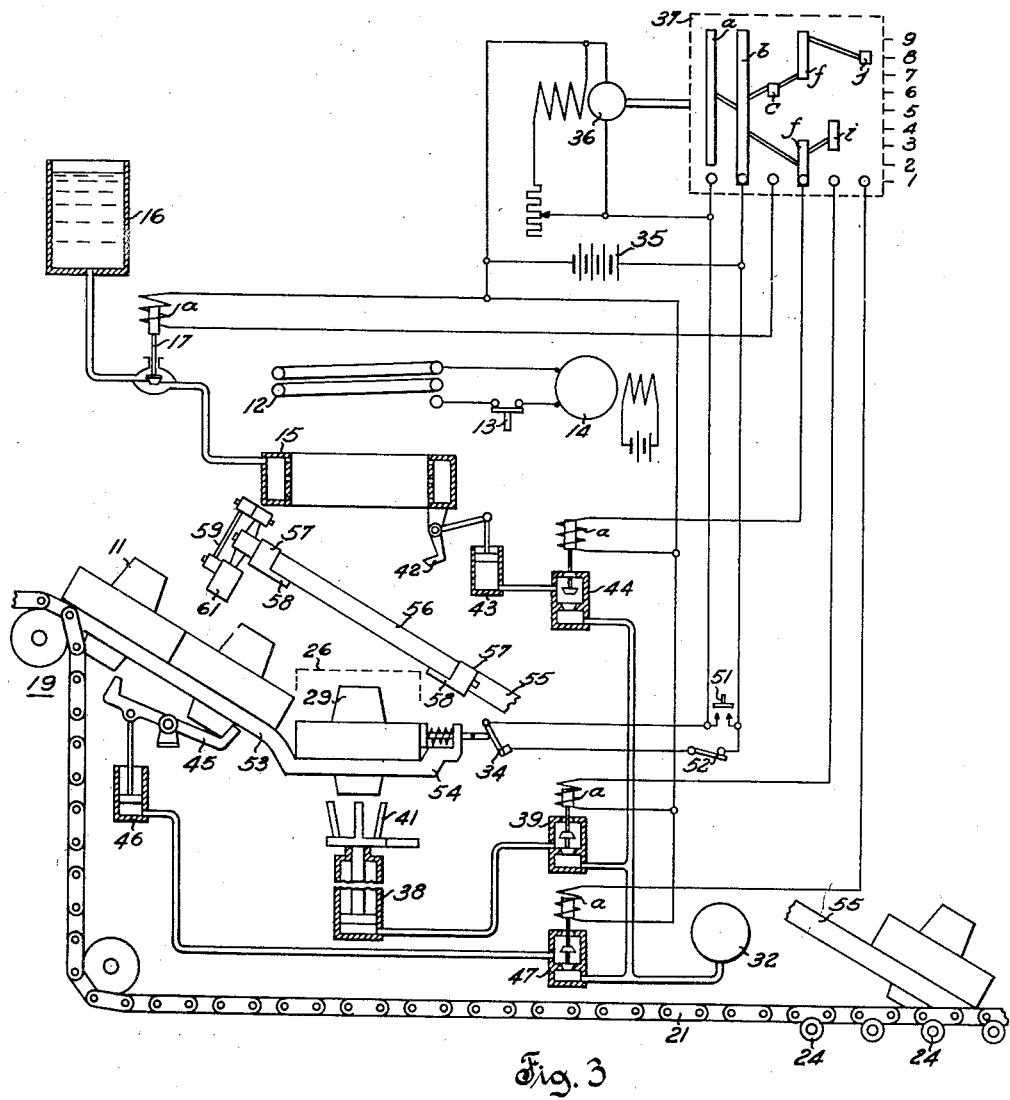
Figure 4:
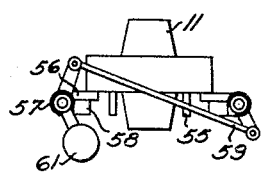
Figure 7:
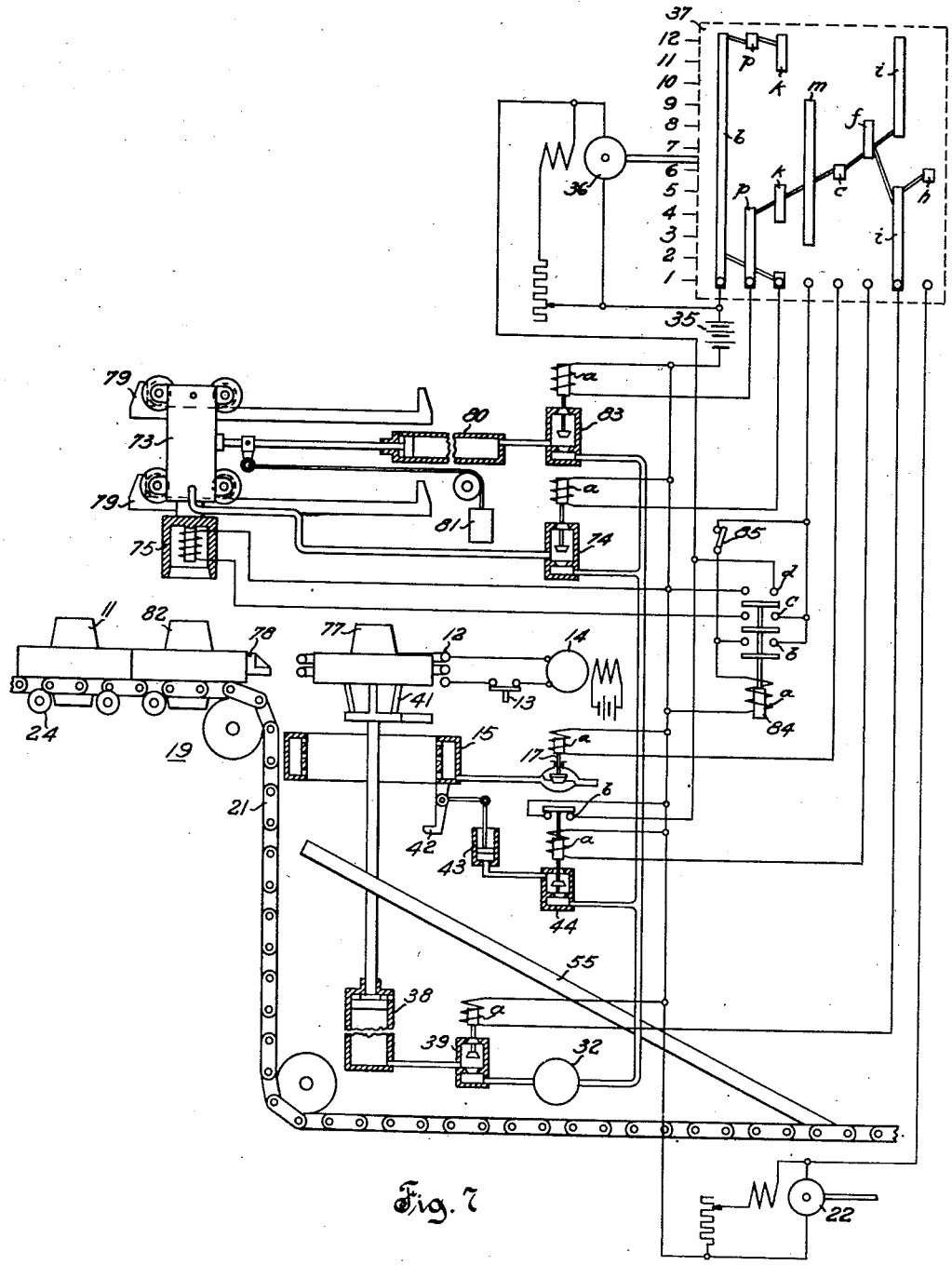

Other purposes and advantages will be apparent from a consideration of the following specification when read in connection with the accompanying drawing, in which:

Fig. 1 diagrammatically illustrates one embodiment of the present invention utilizing an elevator passing through a chain belt conveyer for lifting objects from the conveyer into an inductor and into a quenching nozzle and for returning the objects to the conveyer;

Fig. 2 is a view in cross section of the conveyor taken along line II—II in Fig. 1;

Fig. 3 diagrammatically illustrates a modified embodiment of the present invention in which the objects are transferred between the conveyer and the elevator by means of a stationary loading chute and of a hinged rail unloading chute;

Fig. 4 is an end view of the hinged rail unloading chute of the embodiment illustrated in Fig. 3;

Fig. 5 diagrammatically illustrates another modified embodiment of the present invention in which objects are transferred from the conveyer into a loading station by a chute including a hinged rail section and are moved through an inductor and a quenching nozzle by the cooperative action of two vertical elevators;

Fig. 6 is an end view of the hinged rail mechanism of the embodiment illustrated in Fig. 5; and Fig. 7 diagrammatically illustrates another modified embodiment of the present invention in which objects are transferred from the conveyer to the inductor by a traveling vertical elevator and are moved from the inductor through a quenching nozzle and deposited in an unloading chute by another elevator.

Elements having the same function are designated by the same character of reference in the different figures. It will be understood that elements of any of the embodiments herein illustrated may also be combined with elements of the other embodiments to form further embodiments of the present invention.

Referring more particularly to the drawing by characters of reference, the system illustrated in Fig. 1 is assumed to serve for heat treating the rims of a series of identical wheels 11. The rims are to be heated by induction of current therein from a suitable inductor 12 energized through a switch 13 from any suitable source of alternating current conventionally represented as a synchronous generator 14. If the rims are to be quenched after being heated, as is usually desired, inductor 12 is associated with a quenching nozzle 15 which may be supplied with water or other quenching fluid under pressure from a reservoir 16 through parallel magnet valves 17, 18. Nozzle 15 is disposed in vertical alignment with inductor 12 to the extent that wheels 11 may be moved by a vertical translatory movement from a position in inductive relation with inductor 12 into a quenching position with respect to nozzle 15.

Inductor 12 and nozzle 15 are disposed above a conveyer 19 comprising a pair of chain belts 21 driven by any suitable means, such as a variable speed electric motor 22, through a pair of sprocket wheels 23. Belts 21 are supported on rollers 24 which maintain the belts so spaced that the rims of wheels 11 rest on the belts while the hubs of the wheels may extend between the belts. The top surface of belts 21 is preferably smooth to permit the belts to slip under any wheel which meets an obstruction during the progression thereof on the belts.

Conveyer 19 is associated with a movable stop 25 for stopping a wheel progressed on belts 21 at a loading station 26 in vertical alignment with inductor 12 and nozzle 15. Guides 27 may be provided for centering wheels 11 on conveyer 19 to cause the wheels to assume an accurately defined position in a work loading station 26. Stop 25 is so pivoted and weighted as to normally remain out of engagement with the wheels progressed by the conveyer toward a parallel rail unloading chute 28. The stop may be moved into the operative position shown by means of any suitable actuating means such as a pneumatic motor 31 to stop a wheel 29 in station 26. Air under pressure may be supplied to motor 31 from a reservoir 32 through a magnet valve 33. A switch 34 is disposed to be actuated through a pushrod 30 in response to movement of a wheel into the loading station for connecting a battery 35 or other suitable source of current with a variable speed electric motor 36 driving a timer 37.

Wheel 29 may be lifted into inductor 12 by means of a vertical elevator 38 which may be supplied with compressed air from reservoir 32 through a magnet valve 39. The ram of elevator 38 is provided with a suitable holder 41 adapted to be raised between belts 21 to engage portions of wheel 29 remote from the portion to be heat treated. Defining the different positions of elevator 38 in terms of the corresponding positions of a wheel loaded thereon, Fig. 1 shows the elevator in its bottom position located under the work loading station 26. The elevator is operable through the work loading station 26 to a first work processing station defined by the position to which the wheel 29 is lifted for inductive coupling with the inductor 12. During downward movement from its top position the elevator may be stopped by means of a latch 42 at a second work processing station for holding the wheel in quenching position within nozzle 15. Latch 42 may engage holder 41 at one or more points thereof and may be withdrawn by means of a pneumatic motor 43. Reservoir 32 may be connected with motor 43 through a magnet valve 44. While elevator 38 is in raised position the wheels deposited on the conveyer are prevented from progressing into the work loading station 26 by means of a latch 45. The latch may be released by a pneumatic motor 46 connected with reservoir 32 through a magnet valve 47.

Motor 22, closing coil 13a of the inductor switch 13 and the actuating coils of the magnet valves may be connected with battery 35 in the proper sequence through segments of timer 37. Coil 13a may also be continuously excited through a switch 48 if it is desired to maintain inductor 12 connected with generator 14. Motor 22 may likewise be continuously maintained in operation by means of a switch 49. Operation of timer motor 36 under the control of the segments of timer 37 may be initiated manually by means of a pushbutton switch 51 and may be interrupted upon return of the timer into the position shown by means of a switch 52 connected in series with a switch 34.

The system shown in Fig. 1 is illustrated assuming that the system is in normal operation, with timer 37 in position number 1 thereof reached upon completion of the cycle of heat treatment of a wheel. The sequence of operation of the system will be described as established by one revolution of timer 37 with reference to the different positions thereof numbered 1 to 12 on the drawing.

1. Segment 37f connects coil 44a with battery 35 to maintain latch 42 withdrawn. Segment 37g connects coil 33a with the battery to maintain stop 25 in the operative position shown. Segment 37h connects motor 22 with the battery, and the motor drives conveyer 19 to progress wheel 29 into the work loading station 26 and progress the following wheel into engagement with latch 45. Wheel 29 abuts against stop 25 and pushrod 30 to cause closure of switch 34, which connects motor 36 with the battery to cause timer 37 to be actuated into position 2.

2. Segment 37a maintains motor 36 energized independently of switch 34. Segment 37h disconnects motor 22 from the battery to cause conveyer 19 to stop.

3. Segment 37i connects coil 39a with the battery to cause elevator 38 to lift wheel 29 from the work loading station 26 into the first work processing station, in which the wheel 29 is in inductive relation with inductor 12.

4. Segment 37e connects coil 13a with the battery, and switch 13 closes to connect inductor 12 with generator 14. The rim of wheel 29 is thereby heated by induction during a length of time depending on the speed of motor 36 and on the length of segment 37e. Segment 37g disconnects coil 33a to cause stop 25 to pivot out of the path of wheels 11.

5. Segment 37f disconnects coil 44a to cause latch 42 to advance into its operating position.

6. Segment 37e disconnects coil 13c to cause inductor 12 to be disconnected from generator 14.

7. Segment 37i disconnects coil 39a to cause elevator 38 to drop until holder 41 is arrested by latch 42 to hold wheel 29 in the second work processing station in quenching position within nozzle 15.

7. Segments 37c, 37d connect coils 17a and 18a with the battery to cause valves 17 and 18 to supply cooling water from reservoir 16 to nozzle 15 at the maximum rate. The rim of wheel 29 is thereby intensely cooled to cause hardening of the surface thereof.

8. Segment 37c disconnects coil 17a to cause valve 17 to close. Valve 18 then continues to supply cooling water to nozzle 15 at a reduced rate sufficient to bring wheel 29 to ambient temperature with a reduced expenditure of cooling fluid.

9. Segment 37d disconnects coil 18a to terminate the supply of cooling water to nozzle 15. Segment 37f reconnects coil 44a to cause latch 42 to be withdrawn and release elevator 38, which drops wheel 29 back into loading the work station 26. The elevator returns to the position shown, whereby wheel 29 is unloaded from holder 41. Segment 37h reconnects motor 22, which drives conveyer 19 to progress wheel 29 out of station 26 past stop 25 toward chute 28.

10. Segment 37g reconnects coil 33a to cause stop 25 to return to the position shown.

11. Segment 37j connects coil 47a with the battery to cause latch 45 to release the foremost wheel 11 for progression into station 26 while holding back the following wheel.

12. Segment 37j disconnects coil 47a to cause latch 45 to return to the position shown. The wheel previously held by the left end of latch 45 progresses into abutment with the right end of the latch.

The above outlined sequence of operation is repeated upon each arrival of a wheel into the work loading station 26 to close switch 34. To start the system in the absence of a wheel in the work loading station 26 the conveyer is placed in operation by closing switch 49, and wheels are loaded thereon to cause a wheel to reach a position in engagement with latch 45. One wheel may then be caused to progress into the work loading station 26 by manually actuating latch 45 or by momentarily closing switch 51 to cause timer 37 to operate through a complete revolution. When the operation of the system is to be interrupted, switch 52 is opened to cause motor 36 to become deenergized upon disconnection thereof by segment 37a in response to the next return of timer 37 into the position shown.

The above described operation of the system illustrated in Fig. 1 assumes that wheels are deposited on conveyer 19 at substantially the rate at which the wheels are heat treated in inductor 12 and nozzle 15. It is however often desirable to load wheels on the conveyer in batches at relatively long intervals. For this purpose switch 49 may be closed to continuously maintain conveyer 19 in operation. The wheels loaded on the conveyer then are progressed until they abut against each other and are held stationary by means of latch 45. The conveyer chain belts slip under the wheels except when the wheels are allowed to progress in response to operation of latch 45.

Fig. 3 diagrammatically illustrates a modified embodiment of the invention in which the conveyer operates continuously and in which batches of wheels deposited on the conveyer may be stored in a chute to avoid the wear and expenditure of energy incidental to slippage of the chain belts under a batch of wheels. Wheels 11 are accordingly elevated by the conveyer into a predetermined position at a higher level than the work loading station 26. The conveyer transfers the wheels from the elevated position to a chute 53 consisting of inclined parallel rails for conveying the wheels by gravity toward the work loading station 26 in vertical alignment with inductor 12. Chute 53 is extended by a recessed level section 54 serving as a stop for positioning a wheel in station 26. While chute 53 is shown as containing only two wheels to simplify the drawing, it will be understood that the chute may be made of the required size for storing at least the number of wheels it is desired to deposit at one time on the conveyer.

The heat treated wheels are unloaded from elevator 38 when in a predetermined position by means of an unloading chute 55 consisting principally of a pair of parallel inclined fixed rails which convey the wheels back to belts 21 for further progression thereof. The point at which the wheels are deposited from the chute 55 onto the belts 21 may be defined as a work unloading station. Chute 55 further comprises a pair of hingedly supported inclined rails 56 disposed vertically above station 26 in axial alignment therewith. Rails 56 are mounted on any suitable bearings such as journal bearings 57 associated with stops 58 for releasably holding the rails in the position shown against the action of gravity. When rails 56 are in the position shown they are distant by less than the diameter of wheels 11, but they may be swung apart against the action of gravity by upward passage of a wheel therebetween to become distant by more than the diameter of the wheel. When rails 56 are released by the wheel they return to the position shown by gravity but are cleared by holder 41. Simultaneous and positive operation of the rails may be insured by interconnecting the rails through a connecting rod 59, as shown in Fig. 4, and by providing the rails with a counterweight 61.

In the present embodiment segment 37g is unnecessary, and segments 37d, 37e, 37h have also been omitted to simplify the drawing. It will be understood however that the supply of quenching water to nozzle 15 and the energization of inductor 12 and of the conveyer motor may be again effected and controlled as in the embodiment illustrated in Fig. 1. The operation of the system illustrated in Fig. 3 takes place as follows in response to movement of timer 37 through positions 1 to 9 thereof:

1. Segment 37f connects coil 44a with the battery to maintain latch 42 withdrawn. Switch 34 is closed by progression of wheel 29 into the work loading station 26 to connect timer motor 36 with the battery.

2. Segment 37a maintains timer motor 36 energized independently of switch 34.

3. Segment 37i connects coil 39a with the battery to cause elevator 38 to lift wheel 29 through rails 56 and through nozzle 15 into inductor 12. The wheel swings rails 56 apart, and the rails drop back into the position shown after being released by the wheel. Wheel 29 is held in a first work processing station within inductor 12 by elevator 38 for heating the rim of the wheel during a length of time determined by the length of segment 37*i* and on the speed of motor 36.

4. Segment 37*f* disconnects coil 44*a* from the battery to cause latch 42 to advance into operating position.

5. Segment 37*i* disconnects coil 39*a* from the battery to cause elevator 38 to drop until holder 41 is arrested by latch 42 to hold wheel 29 in a second work processing station in quenching position.

6. Segment 37*c* connects coil 17*a* with the battery to cause nozzle 15 to be supplied with quenching water during a length of time depending on the length of the segment and on the speed of motor 36.

7. Segment 37*c* disconnects coil 17*a* from the battery to terminate the quenching operation. Segment 37*f* reconnects coil 44*a* with the battery to cause latch 42 to be withdrawn. Elevator 38 drops to the bottom position thereof but wheel 29 is retained on rails 56, which are supported by stops 58. The wheel slides on rails 56 and 55 and is deposited at a work unloading station on belts 21.

8. Segment 37*j* connects coil 47*a* with the battery to cause actuation of latch 45. The latch releases the bottom wheel contained in chute 53 to enable the wheel to slide into the work loading station 26.

9. Segment 37*j* disconnects coil 47*a* from the battery to cause latch 45 to return to the position shown. The wheels remaining in chute 53 are thereby allowed to progress by the diameter of one wheel.

In the systems illustrated in Figs. 1 and 3 inductor 12 is utilized for the heating of wheels during only a fraction of the time. By providing a pair of cooperating elevators or equivalent wheel moving means for simultaneously holding one wheel in the inductor of the first work processing station and another wheel in the quenching nozzle of the second work processing station it is possible to utilize the inductor substantially without interruption. A system of the latter character is illustrated in Fig. 5, wherein chute 53 leads wheels 11 to a pair of horizontal rails 62 mounted in suitable bearings such as journal bearings 63. Rails 62 are preferably connected by a connecting rod 64, as shown in Fig. 6, to cause the rails to swing in unison and are biased by means of a counterweight 65 tending to cause the rails to be swung upward. A stop 67 cooperating with a lug 66 mounted on one of rails 62 releasably holds the rails in the position shown against the action of gravity.

Rails 62 are associated with a latch 68 for preventing the rails from being swung downward by the weight of a wheel loaded thereon. A pneumatic motor 69 may be connected with reservoir 32 through a magnet valve 71 to cause withdrawal of latch 68. The wheels stored in chute 53 are positioned one after the other in the loading station on rails 62 by means of guides 27 and of a stop 72.

The wheel located in the work loading station 26 may be moved downward through rails 62 into inductor 12 by means of a depending vertical elevator 73 which may be connected with reservoir 32 through a magnet valve 74. A suitable holding member such as an electromagnetic chuck 75 is provided for releasably suspending a wheel from elevator 73. The wheels stored on chute 53 are held by latch 45 which, in the present embodiment, may be arranged to release the lowermost wheel without holding the remaining wheels. Segment 37*a* is omitted and timer 37 is arranged to operate continuously for the reason that when a wheel is moved in the loading station the preceding wheel is still in process of being heated.

Timer motor 36 is connected with battery 35 through contacts 44*b* of magnet valve 44 or through contacts 71*c* of magnet valve 71. Timer segments 37*m*, 37*n* are provided for controlling the energization of coil 75*a* of chuck 75 and of coil 71*a* respectively. A switch 76 is inserted in the circuit of coil 71*a* to permit interrupting the transfer of wheels from the work loading station to the work processing station comprising the inductor 12 and thereafter causing timer 37 to stop when the wheel being heated has been deposited at a work unloading station on belts 21.

The sequence of operation of the system starting with timer 37 in the position shown is as follows:

1. Wheel 29 is positioned against stop 72 by the pressure of the wheels stored in chute 53, but rails 62 are held in the position shown by latch 68 to hold wheel 29 in the loading station. Segment 37*k* connects coil 74*a* with the battery to cause elevator 73 to be held idle in the raised position. Segment 37*i* connects coil 39*a* with the battery to cause elevator 38 to hold another wheel 77 in the first work processing station in inductive relation with inductor 12.

2. Segment 37*k* disconnects coil 74*a* from the battery to cause elevator 73 to drop chuck 75 on wheel 29.

3. Segment 37*m* connects chuck coil 75*a* with the battery to cause chuck 75 to hold wheel 29 suspended from elevator 73.

4. Segment 37*i* disconnects coil 39*a* from the battery to cause elevator 38 to drop until holder 41 engages latch 42 to hold wheel 77 in the second work processing station in quenching nozzle 15. Simultaneously therewith or previously or subsequently thereto, segment 37*c* connects coil 17*a* with the battery to cause quenching water to be supplied to nozzle 15 to quench the rim of wheel 77. Segment 37*n* connects coil 71*a* with the battery to cause latch 68 to be withdrawn. Wheel 29 is lowered through rails 62 by elevator 73, swinging the rails apart downward and stopping in the position previously occupied by wheel 77 in inductor 12. Rails 62 are returned to the position shown by weight 65. Heating of wheel 29 thus begins while wheel 77 is being quenched and follows the heating of wheel 77 substantially without interruption in the use of inductor 12. The wheels stored on chute 53 are held by latch 45 after wheel 29 leaves station 26. Operation of valve 71 also causes closure of contacts 71*b* completing a holding circuit independent of switch 76 for coil 71*a* and closure of contacts 71*c* in parallel with contacts 44*b*.

5. Segment 37*c* disconnects coil 17*a* from the battery to interrupt the supply of quenching water to nozzle 15. Segment 37*f* connects coil 44*a* with the battery to cause latch 42 to be withdrawn. Elevator 38 is thereby caused to return toward the bottom position thereof to unload wheel 77 at the work unloading station on belts 21 to be further progressed by the belts. Operation of valve 44 also causes opening of contacts 44*b*, which however are then short circuited by contacts 71*c*.

6. Segment 37*i* reconnects coil 39*a* with the battery to cause elevator 38 to return to the position shown in the first work processing station to support wheel 29, which is then being heated in inductor 12.

7. Segment 37m disconnects coil 75a from the battery to cause chuck 75 to release wheel 29. Segment 37f disconnects coil 44a from the battery to cause latch 42 to be advanced into the operative position shown. Contacts 44b are also reclosed to maintain motor 36 connected with the battery independently of contacts 71c.

8. Segment 37k connects coil 74a with the battery to cause elevator 73 to return to the raised position shown. Segment 37n disconnects coil 71a from the battery to cause latch 68 to return to the engaged position shown and prevent rails 62 from being swung downward by an incoming wheel.

9. Segment 37j connects coil 47a with the battery to cause latch 45 to release the wheels stored in chute 53. The wheels progress by substantially the diameter of one wheel to bring the lowermost wheel into loading station 26.

10. Segment 37j disconnects coil 47a from the battery to cause latch 45 to return to the position shown to hold the wheels stored in chute 53 out of the path of chuck 75 when the wheel placed in the loading station is dropped through rails 62.

The above outlined sequence of operations is repeated during each revolution of timer 37, which rotates continuously. When it is desired to interrupt the operation of the system, switch 76 is opened to prevent energization of coil 71a. Subsequent transfer of a wheel from the work loading station 26 into inductor 12 by elevator 73 is thereby prevented independently of continued operation of timer 37. Motor 36 continues to drive timer 37 to cause the wheel then being heated or quenched to be subjected to its complete heat treatment. When timer 37 reaches position 5, valve 44 is actuated to cause elevator 38 to complete its cycle of operation and bring the heat treated wheel into the work unloading station on belts 21. Contacts 44b open to disconnect motor 36 from the battery and thereby cause the timer to stop.

If switch 76 is opened while coil 71a is already energized through segment 37n the coil is maintained energized through contacts 71b to cause timer 37 to continue to operate through the positions at which valve 44 is actuated, including position 5. Complete heat treatment of the wheel placed in inductor 12 is thereby insured and timer 37 stops upon the next return thereof to position 5.

In the embodiment illustrated in Fig. 7 chute 53 and rails 62 are omitted to simplify the system. The wheels are progressed by the conveyer until they abut a fixed stop 78 and the conveyer may be allowed to operate continuously or to be driven intermittently under the control of timer segment 37h. To bring the wheels one at a time into a loading station corresponding to the work loading station 26 of Fig. 5, elevator 73 is mounted on a track 79 and is caused to travel thereon by a pneumatic motor 80 actuable against the action of a return weight 81 to cause the elevator to assume a position above a wheel 82 abutting against stop 78. Motor 80 may be connected with reservoir 32 through a magnet valve 83 controlled by a segment 37p at the timer. Chuck 75 is preferably energized from battery 35 through segment 37m and through contacts 84c of a relay 84 controlled by a switch 85 cooperating with timer segment 37m. Contacts 84d of relay 84 are connected across contacts 44b in the circuit of motor 36. The sequence of operation of the system starting with timer 37 in the position shown is as follows:

1. Segment 37p connects coil 83a with the battery to cause motor 80 to maintain elevator 73 above wheel 82 against the action of weight 81. Segment 37k connects coil 74a with the battery to cause elevator 73 to hold chuck 73 in the raised position shown. Segment 37i connects coil 39a with the battery to cause elevator 38 to hold wheel 77 in a first work processing station in inductor 12.

2. Segment 37k disconnects coil 74a from the battery to cause elevator 73 to drop chuck 75 on wheel 82.

3. Segment 37m connects coil 84a with the battery through switch 85. Relay 84 closes contacts 84c to connect coil 75a with the battery and thereby cause chuck 75 to hold wheel 82. Relay 84 also closes contacts 84b to energize coil 84a independently of switch 85 and closes contacts 84d to short circuit contacts 44b.

4. Segment 37k reconnects coil 74a with the battery to cause elevator 73 to lift wheel 82 from a work loading station on belts 21.

5. Segment 37p disconnects coil 83a from the battery to enable weight 81 to move elevator 73 into vertical alignment with inductor 12.

6. Segment 37i disconnects coil 39a from the battery to cause elevator 38 to drop until holder 41 engages latch 42 to hold wheel 77 in a second work processing station in quenching nozzle 15. Segment 37c connects coil 17a with the battery to cause quenching water to be supplied to nozzle 15. Segment 37k disconnects coil 74a from the battery to cause elevator 73 to lower wheel 82 into the space previously occupied by wheel 77 in inductor 12. Segment 37h connects motor 22 with the battery to cause conveyer 19 to progress wheels 11 at least until the foremost wheel 11 engages stop 78.

7. Segment 37c disconnects coil 17a from the battery to interrupt the supply of quenching water to nozzle 15. Segment 37h disconnects conveyer motor 22 from the battery to cause conveyer 19 to stop. Segment 37f connects coil 44a with the battery to cause latch 42 to be withdrawn. Elevator 38 drops to the bottom position thereof but wheel 77 is retained in chute 55, which deposits the wheel at a work unloading station on belts 21. Wheel 77 is thereby immediately removed from the path of elevator 38 and the elevator may again be raised without waiting for the conveyer to resume its progression.

8. Segment 37i reconnects coil 39a with the battery to cause elevator 38 to rise to the top position thereof and support wheel 82, which is then being heated in inductor 12.

9. Segment 37f disconnects coil 44a from the battery to cause latch 42 to return to the advanced position shown. Contacts 44b are reclosed to connect timer motor 36 with the battery independently of contacts 84d.

10. Segment 37m disconnects coil 84a from the battery to cause relay 84 to return to the position shown. Relay 84 opens contacts 84c to deenergize coil 75a, and the chuck releases wheel 82, which is then supported by elevator 38.

11. Segment 37k reconnects coil 74a with the battery to cause elevator 73 to raise chuck 75 into the top position thereof.

12. Segment 37p connects coil 83a with the battery to cause motor 80 to return elevator 73 into the position shown.

The operation of the system may be interrupted by opening switch 85. Relay 84 is thereby prevented from being energized through segment 37m, and coil 75a remains deenergized upon the next descent of chuck 75 into engagement with a wheel so that the transfer of wheels from the conveyer to inductor 12 no longer can take place. The wheel being heated at the time of opening switch 85 however receives its complete heat treatment and is unloaded into chute 55 in response to operation of valve 44. Valve 44 also opens contacts 44b, thereby disconnecting motor 36 from the battery and stopping the operation of timer 37 at position 7 thereof. If switch 85 is opened while relay 84 is already energized, the relay remains energized through contacts 84b to cause timer 37 to continue to operate through position 7. The wheel then being held in inductor 12 receives its complete heat treatment and the timer stops upon the next return thereof into the position 7 at which the wheel is deposited in chute 55.

Although but a few embodiments of the present invention have been illustrated and described, it will be apparent to one skilled in the art that various changes and modifications may be made therein without departing from the spirit of the invention or from the scope of the appended claims.

It is claimed and desired to secure by Letters Patent:

1. In combination, a belt conveyer for progressing a series of objects, means for stopping at a work loading station one of said objects progressed by said conveyer, elevator means responsive to the deposition of said one of said objects in said work loading station for translating said one of said objects from said work loading station to a work processing station remote from said work loading station, releasable means for holding said one of said objects at said work processing station, and means for causing the return of said one of said objects to said conveyer at a work unloading station remote from said work loading station for resumption of progression of said one of said objects upon release of said object by said releasable means.

2. In combination, a belt conveyer for progressing a series of objects, means operable during progressing movement of said conveyer for stopping at a work loading station one of said objects progressed by said conveyer, elevator means operable through said work loading station for moving said one of said objects, said elevator means having a lowered position under said work loading station and a raised position above said work loading station, a latch for stopping said elevator means intermediate said raised and lowered positions for holding said object at a work processing station above said work loading station, and means for releasing said latch after said elevator has been in said work processing station for a predetermined time for returning said one of said objects from said work processing station to said conveyer.

3. In combination, a belt conveyer for progressing a series of objects, means actuated by one of said objects for stopping said conveyer in response to progression of said one of said objects by said conveyer into a work loading station, means comprising an elevator for translating said one of said objects from said work loading station to a work processing station, means for returning said one of said objects to said conveyer, and means controlled by said stopping means for causing resumption of progression of said conveyer after said elevator deposits said one of said objects on said conveyer.

4. In combination, a belt conveyer disposed for progressing an object, a first chute for the transfer of said object by gravity between a work loading station and a work unloading station, the work unloading station being on said belt and the work loading station being remote from said belt, a second chute comprising a pair of hinged supporting rails disposed in vertical alignment with the said other of said positions and stop means for releasably holding said rails against the action of gravity, said rails when engaged with said stop means being distant by less than the width of said object and being swingable against the action of gravity to become distant by more than the width of said object, and an elevator for moving said object from said work loading station through said chute, thereby causing said rails to be swung apart by passage of said object therebetween and to return into engagement with said stop means after passage of said object therebetween.

5. In combination, a belt conveyer for progressing an object, a loading chute for conveying said object by gravity from said conveyer, means associated with said chute for positioning said object in a work loading station, an unloading chute comprising a pair of hingedly supported inclined rails disposed above said positioning means and stop means for releasably holding said rails against the action of gravity, said rails when engaged with said stop means being distant by less than the width of said object and being swingable apart against the action of gravity to become distant by more than the width of said object, and means comprising an elevator for raising said object into a work processing station above said work loading station, thereby causing said rails to be swung upward by passage of said object therebetween and to return into engagement with said stop means after passage of said object therebetween, said elevator lowering said object from said work processing station onto said rails and releasing said object for discharge thereof by said unloading chute in response to return of said elevator towards said work loading station.

6. In combination, a belt conveyer for progressing an object, means for transferring said object from said conveyer to a work loading station, means including a first elevator for moving said object from said work loading station to a first work processing station remote from said work loading station, and a second elevator for successively moving said object from said first work processing station to a second work processing station and from said second work processing station to a work unloading station.

7. In combination, a belt conveyer for progressing an object, means for transferring said object from said conveyer to a work loading station, means including a first elevator for moving said object from said work loading station to a first work processing station remote from said work loading station, a second elevator operable for moving said object from said first elevator at said first work processing station to a second work processing station, and timing means comprising a clock mechanism for controlling said elevators for causing operation of said first elevator and for causing said second elevator to successively move said object to said second work processing station and from said second work processing station to a work unloading station.

8. In combination, a belt conveyer for progressing a series of objects, means for transferring one of said objects from said conveyer to a work loading station, means including a first elevator for moving said one of said objects from said work loading station to a first work processing station remote from said work loading station, a second elevator operable for moving said one of said objects from said first elevator at said first work processing station to a second work processing station, and timing means comprising a clock mechanism for controlling said elevators for causing operation of said first elevator, and for causing said second elevator to successively move said one of said objects to said second work processing station and from said second work processing station to a work unloading station, and for causing said first elevator to hold another of said objects in said first work processing station while said one of said objects is held by said second elevator in said second work processing station.

9. In combination, a belt conveyer for progressing an object, means for disposing said object in a work loading station, first and second elevators, means for suspending said object from said first elevator, and timing means comprising a clock mechanism controlling said elevators and said suspending means for successively causing said suspending means to hold said object, said first elevator to move said object from said work loading station into a first work processing station, said second elevator to support said object in said first work processing station, causing said suspending means to release said object, and causing said second elevator to move said object to a second work processing station and to a work unloading station.

10. In combination, a belt conveyer for progressing a series of objects, means for disposing one of said objects in a work loading station, first moving means operable to move said one of said objects from said work loading station into a first work processing station, second moving means operable to move said one of said objects successively from said first work processing station to a second work processing station and to a work unloading station, timing means comprising a clock mechanism controlling said moving means to cause operation thereof for the simultaneous holding of said one of said objects in said first work processing station and another of said objects in said second work processing station, and means for interrupting the operation of said timing means comprising means for interrupting the operation of said first moving means independently of said timing means and means responsive to operation of said timing means for causing completion of the operation of said second moving means.

11. In combination, chute means for the progression by gravity of an object, means defining a work loading station associated with said chute means for interrupting the progression of said object along said chute means, said chute means including a chute comprising a pair of hinged supporting rails at one end thereof and stop means for releasably holding said rails against the action of gravity, said rails when engaged with said stop means being distant by less than the width of said object and being swingable against the action of gravity to become distant by more than the width of said object, and an elevator for moving said object vertically from said work loading station through said chute, thereby causing said rails to be swung apart by the passage of said object therebetween and to return into engagement with said stop means after passage of said object therebetween.

12. In combination, a first chute for the progression of an object by gravity, means defining a work loading station associated with said first chute for interrupting the progression of said object along said chute, a second chute comprising a pair of hinged supporting rails disposed in vertical alignment with said work loading station and stop means for releasably holding said rails against the action of gravity, said rails when engaged with said stop means being distant by less than the width of said object and being swingable against the action of gravity to become distant by more than the width of said object, and an elevator for moving said object from said work loading station through said second chute, thereby causing said rails to be swung apart by passage of said object therebetween and to return into engagement with said stop means after passage of said object therebetween.

13. In combination, a loading chute for conveying an object by gravity, means associated with said chute for positioning said object in a work loading station, an unloading chute comprising a pair of hingedly supported inclined rails disposed above said work loading station and stop means for releasably holding said rails against the action of gravity, said rails when engaged with said stop means being distant by less than the width of said object and being swingable apart against the action of gravity to become distant by more than the width of said object, and means comprising an elevator for raising said object into a work processing station above said work loading station, thereby causing said rails to be swung upward by passage of said object therebetween and to return into engagement with said stop means after passage of said object therebetween, said elevator lowering said object from said work processing station onto said rails and releasing said object for discharge thereof by said unloading chute in response to return of said elevator towards said work loading station.

14. In combination, a belt conveyer for progressing a series of objects, means for maintaining at a work loading station one of said objects progressed by said conveyer during continued movement of said conveyer, means defining a plurality of work processing stations, elevator means for translating said one of said objects from said work loading station to a first of said work processing stations remote from said work loading station, timing means for causing said elevator means to translate said object from said first of said work processing stations to a second of said work processing stations remote from said work loading station after a predetermined time, said timing means being operative after a further predetermined time to return said object from said second of said work processing stations to said conveyer.

15. In combination, a belt conveyer disposed for progressing an object, a chute for the transfer of said object by gravity between two stations, one of said stations being on said conveyer and the other of said stations being remote from said conveyer, and an elevator for moving said object vertically from either of said stations to the other of said stations through said chute, said chute comprising a pair of hinges at one end thereof having their respective axes on opposite sides of said elevator, a pair of supporting rails mounted on said hinges, and stop means for releasably holding said rails against the action of gravity, said rails when engaged with said stop means being distant by less than the width of said object and being swingable against the action of gravity to become distant by more than the width of said object, whereby movement of said object by said elevator causes said rails to be swung apart by passage of said object therebetween and causes said rails to return into engagement with said stop means after passage of said object therebetween.

16. In combination, a belt conveyer disposed for progressing an object, means operable during continuing movement of said conveyer for stopping in a work loading station one of said objects progressed by said conveyer, vertical elevator means operable through said work loading station, said elevator means having a predetermined stroke ending at a first work processing station, means for arresting said elevator means at a second work processing station remote from said work loading station and intermediate said predetermined stroke, and means responsive to deposition of said object in said work loading station for causing said elevator means to move said object from said loading station successively to either one of said work processing stations, to the other of said work processing stations, and back to said conveyer.

DIDIER JOURNEAUX.

REFERENCES CITED

The following references are of record in the file of this patent:

UNITED STATES PATENTS

| Number | Name | Date |
| --- | --- | --- |
| 1,367,124 | Colby | Feb. 1, 1921 |
| 1,702,985 | Twyman | Feb. 19, 1929 |
| 2,093,061 | Wallace | Sept. 14, 1937 |
| 2,172,386 | Huff | Sept. 12, 1939 |
| 2,182,799 | Farr | Dec. 12, 1939 |
| 2,280,064 | Denneen et al. | Apr. 21, 1942 |
| 2,282,322 | Denneen et al. | May 12, 1942 |
| 2,296,291 | Carter | Sept. 15, 1942 |
| 2,325,079 | Soderholm | July 27, 1943 |
| 2,352,709 | Haase | July 4, 1944 |
| 2,352,762 | Bell | July 4, 1944 |
| 2,367,505 | Kane | Jan. 16, 1945 |
| 2,407,230 | Furkert | Sept. 10, 1946 |
| 2,414,362 | Denneen et al. | Jan. 14, 1947 |

OTHER REFERENCES

"Steel," July 9, 1945, page 104.